Patented Feb. 19, 1929.

1,702,965

UNITED STATES PATENT OFFICE.

JOSEPH F. HAGGERTY, OF BUFFALO, NEW YORK, ASSIGNOR TO NATIONAL GYPSUM COMPANY, OF BUFFALO, NEW YORK, A CORPORATION OF DELAWARE.

PLASTIC COMPOSITION AND METHOD OF MAKING THE SAME.

No Drawing.   Application filed October 27, 1925. Serial No. 65,245.

This invention relates to plastic compositions which are formed by mixing a plastic material, such as plaster of Paris with water and forming the material while in a wet or semifluid condition into the desired shape and permitting the composition to harden or crystallize in such a shape.

In the manufacture and use of gypsum products, considerable difficulty has been experienced owing to the fact that the gypsum products are very brittle and consequently are easily broken in shipment or in handling during the manufacture or during the use of the product. For example, gypsum tile has been found very satisfactory as building material because of its fire resisting and heat insulating properties and for the reason that it does not readily crack when subjected alternately to extremes in temperature. Gypsum tile, however, as heretofore made has the objection of being extremely brittle so that if a tile is dropped by a workman, the tile will break or splinter. Compositions of this kind are also subject to cracking and splintering when nails are driven into the same. Similar difficulties are encountered when gypsum is embodied in a wall board or made into panels, sheets or other forms.

In order to overcome this objection, sawdust, wood shavings and other fibers have been mixed with the composition for the purpose of decreasing the weight of the composition as well as descreasing the tendency to breaking or chipping when subjected to shocks. These fibrous materials have usually been added to the composition in dry form, and while these materials reduce somewhat the weight of the product and perhaps also render the product slightly less liable to chip or splinter, the fibrous materials, since they are dry when added to the composition, have the property of weakening the composition for the reason that some of the water which is necessary for crystallization is absorbed by the sawdust or other dry fibrous material, so that particles of the plastic mass of gypsum in the immediate vicinity of the fibrous material are weakened by being imperfectly crystallized due to the withdrawing of some of the water therefrom by the fibrous material. Consequently these materials do not form a satisfactory bond between the surrounding particles of gypsum.

Materials in the nature of starches have also been employed in the gypsum for the purpose of strengthening the product and also lightening the same for the reason that the starch absorbs large quantities of water and consequently after the gypsum composition is dried by driving off the water, the resulting composition will remain more or less porous. Starchy materials, on the other hand do not form bonds between adjacent particles of gypsum and also add considerably to the cost of the gypsum composition, as well as attracting moisture.

The main object of the present invention is to provide a gypsum composition which is stronger than compositions of this kind heretofore made, which fact consequently makes it possible to employ a composition of this kind for purposes for which it has heretofore been found impractical to use gypsum compositions, as well as enabling the composition to be used with better results for purposes for which other gypsum compositions have heretofore been used. Other objects of the invention are to provide a composition which can be made of lighter weight and at a lower cost than has heretofore been possible; also to provide a composition of this kind which can be more readily spread or worked into the desired shape or form than other gypsum compositions heretofore made.

In accordance with my invention I mix plaster of Paris or anhydrous gypsum with water or other liquid containing fibrous material which has been soaked to absorb as much as possible of the liquid. The mixing of the materials is preferably effected in such a manner so that the fibrous material will be distributed as uniformly as possible throughout the composition. The mixture or paste so made may then be used for any desired purpose, for example, in connection with the manufacture of plaster board, or the material may be poured into suitable molds for use as tile and for other purposes, or the composition may be formed into sheets, panels or slabs for any desired purpose. The percentage of fibrous material used in the composition may vary, depending upon the nature of the fibrous material employed and also depending upon the purpose for which the product is to be used. For example, in some compositions 5 percent or less by weight (dry weight) of fibrous material can be employed with good results while in other cases larger or smaller percentages are preferred.

Any suitable or desired fibrous material may be employed in my composition. For example, wood fiber or pulp may be used for this purpose and these fibers may be obtained by reducing paper, such as old newspapers to a fine pulp, in any suitable manner, for example, by means of the usual beater, which reduces the paper into finely divided form and thoroughly mixes the same with water to form a flocculent mass. Other papers may, of course, be used but newspaper has been found very satisfactory and is, therefore, desirable because of its cheapness. Practically any other kind of vegetable fiber may be used and some animal fibers may also be successfully used in the making of my composition, it being desirable to use a material which can be readily reduced or formed into a wet flocculent mass.

When the finely divided fibrous material has been thoroughly mixed with water so that the fibers are thoroughly soaked, the mixture of water and fibrous material is further mixed with the plaster of Paris in the desired proportion and the composition while in wet, semi-liquid, or pasty condition is poured, rolled, or otherwise formed into the desired shape and is then permitted to crystallize and dry, or the composition after crystallizing may be dried by heating the same, to expel free moisture therefrom. The composition thus produced will have finely divided fibrous material distributed substantially uniformly throughout the same which greatly increases the strength of the composition and also reduces the weight thereof.

The fibers which are thoroughly distributed throughout the composition are firmly embedded in the cementitious material, the particles of which strongly adhere to the fibers. The fibers serve to reinforce the cementitious material, adding their strength to that of the gypsum. The use of finely divided fibrous material of this kind in gypsum compositions has been found to change the nature of the composition so that the brittleness or tendency to splinter is entirely eliminated. My improved composition has been found to be tougher than compositions heretofore made in which dry sawdust or wood shavings were mixed with the plaster of Paris during the making of the composition and this is probably due to the fact that in the first place the fibrous particles of my composition are finely divided and uniformly distributed throughout the composition, and in the second place to the fact that these particles are mixed while in wet condition with the plaster of Paris, so that none of these particles have any tendency whatever to abstract from the composition water which is necessary for the crystallization of the plaster of Paris. My improved composition is also very much lighter in weight than compositions heretofore made. This is due to the fact that the fibers absorb or hold a large quantity of water. Consequently the amount of water mixed with the plaster of Paris can be greatly increased by using finely divided fibrous material, because in the first place the fibers themselves absorb a quantity of water and in the second place the amount of water mixed with the plaster of Paris can be further increased because of the fact that the addition of the fibrous material increases the viscosity of the mixture of water and plaster of Paris.

It is well known that the lightness of the gypsum composition depends upon the amount of water which is mixed with the plaster of Paris, since the excess water, after crystallization, is driven off, leaving the composition of more or less porous or cellular structure. The amount of water which can be added to plaster of Paris to make gypsum products, however, has practical limits in that the viscosity of the mixture must be such that there will be no precipitation or settling of the plaster of Paris to the bottom of the mold. Consequently the amount of water which can be added to plaster of Paris when gypsum compositions are formed in accordance with my invention is increased both due to the fact that the fibers themselves absorb water and to the fact that the use of fibers increases the viscosity of the mixture and thus prevents precipitation. For example if eight parts by weight of water are mixed with six parts of plaster of Paris, the mixture is so thin that the plaster of Paris settles to the bottom and the mixture cannot be used for pouring into molds or for plastering. If on the other hand a comparatively small amount of paper or fibrous material in finely divided form, for example one half part by weight, is first added to the water, the resulting mixture forms a paste which can be readily worked, moulded or otherwise utilized. The extraordinary absorption properties of vegetable pulps are demonstrated by the fact that a mixture of only one part by dry weight of newspaper fibers with 10 parts of water comprises a flocculent mass having a consistency approximating that of porridge or thin paste. Such a mixture requires much less plaster of Paris to form a workable paste than is the case where water alone is used, and thus for a given amount of plaster of Paris, more water can be used in forming the paste than has heretofore been considered possible. When this free water is driven out of the composition by the drying operation, the resulting rigid composition will be lighter because of the fact that the same is more porous and at the same time it has been found that the composition has no tendency to splinter or crack, due, in the first place, to the fact that the fibers are finely divided and uniformly distributed throughout the entire composition and, in the second place, that the fibers have not robbed the plaster of Paris of any of the water necessary for crystallization, so that a perfect and very secure bond is formed between each of the particles of fibrous material and the surrounding plaster of Paris. The toughness of my improved composition is probably also due to the fact that the fibers used in the composition are so small that any shrinking action which takes place when the product is dried is not sufficient to cause the fibers to pull away from adjacent gypsum or from each other. The composition also has the advantage that when the composition is once dried it has very little tendency to absorb moisture from the air and furthermore my improved composition has no tendency whatever to attract vermin.

My improved composition has the advantage that it is of such strength that it is possible to employ this composition for purposes for which it has hitherto been considered unsatisfactory, and the composition can also be employed for purposes for which gypsum compositions have heretofore been employed, with much more satisfactory results than were heretofore obtained. For example, when the composition is used in gypsum tile, the tile can be dropped in the ordinary course of handling and shipping without splintering or cracking and when embodied in a wall, the tile is not damaged by driving nails or the like into the same, and has all the fire and heat resisting properties of gypsum tile as heretofore made. My improved composition because of its lightness, may be also used to good advantage for casting roof decks over which roofing may be secured or for decks for flooring, and other purposes, and when used in wall construction my composition can be nailed without danger of splintering or cracking. My improved composition, when used as a plaster, has great advantages over plasters heretofore used in that it can be much more easily spread or formed into the desired shapes, since the material offers much less resistance to spreading by a trowel or other implement and can be more easily forced between the lath or other holding means. Also the plaster is much lighter in weight, has less tendency to crack or splinter, and is a better non-conductor of heat than plasters heretofore used.

The composition described also has the advantage of cheapness, in the first place because the composition can be made with a larger percentage of water and a smaller percentage of plaster of Paris than has heretofore been possible, secondly because the fibrous material which is used in the composition is very inexpensive, and furthermore because the reduction in the weight of my composition as compared with other gypsum compositions reduces shipping and handling expenses.

I claim as my invention:—

1. The process which includes forming a flocculent mass comprising finely divided fibrous material and a liquid, the fibers being thoroughly saturated with the liquid, adding plaster of Paris to form a paste, and shaping the paste into the desired form, the relative proportions of the plaster of Paris and fibrous material being in the neighborhood of at least six parts of plaster of Paris by weight to one-half part of fibrous material by weight.

2. The process which includes forming a flocculent mass comprising finely divided fibrous material and a liquid, the fibers being thoroughly saturated with the liquid, adding plaster of Paris to form a paste, and shaping the paste into the desired form, the quantity of fibrous material being approximately equal to 5% of the quantity of gypsum by weight.

3. The process which includes forming a flocculent mass comprising thoroughly beaten wood fiber and a liquid, adding dry plaster of Paris to form a paste, and shaping the paste into the desired form, the relative proportions of fiber and plaster of Paris being such that the plaster of Paris forms a rigid continuous structure.

4. The process which includes forming a flocculent mass comprising wood fiber and a liquid, the fibers being thoroughly saturated with the liquid, then adding plaster of Paris to form a paste, and shaping the paste into the desired form, the relative amounts of fiber and plaster of Paris being such that in the final product the plaster of Paris comprises a rigid, continuous structure reinforced by the fiber, the product being homogeneous throughout.

5. The method of making a plastic composition which comprises reducing a fibrous material to a condition in which the fibres are separated from each other, soaking the fibres in water to cause the same to become thoroughly saturated with water, mixing the water with the fibrous material suspended therein with plaster of Paris to produce a substantially uniform distribution of fibres thruout the mixture, forming the mixture into the desired shape and permitting the same to harden, and removing the free moisture from the composition by evaporation, the quantity of fibres being approximately 5% by weight of the plaster of Paris.

6. The method of making a plastic composition, which consists in subjecting a material consisting mainly of water and fibers to the action of a beater to produce a separation of the fibers from each other, forming a paste by mixing plaster of Paris with the mixture of water and the fibers to produce a substantially uniform distribution of the fibers throughout the composition, shaping the paste thus formed and permitting the same to harden, and removing free moisture from the composition, the proportion of the fibers to the gypsum being about 5% by weight.

7. A composition consisting mainly of plaster of Paris and pulped fibrous material characterized by the fibrous material having been thoroughly incorporated with the plaster of Paris while in a water soaked flocculent condition, and the amount of fibrous material in the finished product being equal to approximately 5% to 8% by weight of the quantity of plaster of Paris.

JOSEPH F. HAGGERTY.